United States Patent
Beer et al.

(10) Patent No.: US 10,353,052 B2
(45) Date of Patent: Jul. 16, 2019

(54) OBJECT DISCRIMINATION BASED ON A SWARM OF AGENTS

(71) Applicant: Lawrence Livermore National Security, LLC, Livermore, CA (US)

(72) Inventors: N. Reginald Beer, Pleasanton, CA (US); David Chambers, Livermore, CA (US); Hema Chandrasekaran, San Ramon, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 274 days.

(21) Appl. No.: 15/267,066

(22) Filed: Sep. 15, 2016

(65) Prior Publication Data
US 2018/0074174 A1 Mar. 15, 2018

(51) Int. Cl.
| | |
|---|---|
| *B63G 9/02* | (2006.01) |
| *G01S 7/41* | (2006.01) |
| *B64C 39/02* | (2006.01) |
| *G01S 13/88* | (2006.01) |
| *G01S 7/539* | (2006.01) |

(52) U.S. Cl.
CPC ............... *G01S 7/411* (2013.01); *B63G 9/02* (2013.01); *B64C 39/024* (2013.01); *G01S 7/539* (2013.01); *G01S 13/885* (2013.01); *B64C 2201/12* (2013.01)

(58) Field of Classification Search
CPC ..... G01S 5/04; G01S 5/06; G01S 7/54; G01S 13/88; G01S 13/885; B64C 2201/12; B64C 2201/123; B64C 2201/127
See application file for complete search history.

(56) References Cited

U.S. PATENT DOCUMENTS

| | | | | |
|---|---|---|---|---|
| 6,712,312 B1* | 3/2004 | Kucik | ................... | B64C 39/024 244/1 R |
| 8,234,067 B2* | 7/2012 | Bauer | .................. | G01C 21/005 701/301 |
| 8,717,223 B2 | 5/2014 | Chambers et al. | | |
| 8,761,603 B1* | 6/2014 | Maleki | .................... | G01S 7/003 398/129 |

(Continued)

OTHER PUBLICATIONS

Cavazzuti, M., "Optimization Methods: From Theory to Design," Springer-Verlag Berlin Heidelberg, 2013, chap. 2, pp. 13-56.

(Continued)

*Primary Examiner* — Peter M Bythrow
(74) *Attorney, Agent, or Firm* — Perkins Coie LLP

(57) ABSTRACT

A configuration system for identifying a target configuration of agents for acquiring data is provided. In some embodiments, the configuration system generates sample configurations, each of which has a location within the space for each agent. The configuration system selects as the target configuration a sample configuration that is suitable to acquire data. The configuration system selects the target configuration by, for at least one or more sample configurations, directing that the agents assume the sample configuration and then acquire data when in the sample configuration. The configuration system then stores, for each sample configuration, an indication of suitability for acquiring data based on the sample configuration. The configuration system selects a sample configuration that is deemed to be suitable as the target configuration.

100 Claims, 14 Drawing Sheets

(56) References Cited

U.S. PATENT DOCUMENTS

| | | | | |
|---|---|---|---|---|
| 8,766,845 | B2 | 7/2014 | Hallquist et al. | |
| 9,043,021 | B1* | 5/2015 | Clark | G06Q 10/06311 |
| | | | | 700/248 |
| 9,102,406 | B2* | 8/2015 | Stark | B64C 39/024 |
| 9,104,201 | B1* | 8/2015 | Pillai | B64C 39/024 |
| 9,407,881 | B2* | 8/2016 | Renkis | H04N 7/181 |
| 9,429,945 | B2* | 8/2016 | Pulleti | G01S 13/56 |
| 9,599,994 | B1* | 3/2017 | Bogdanowicz | G05D 1/104 |
| 9,780,859 | B2* | 10/2017 | Chang | H04B 7/0413 |
| 9,798,329 | B2* | 10/2017 | Shattil | B64C 39/024 |
| 9,841,761 | B2* | 12/2017 | Shehata | H04N 7/181 |
| 9,989,965 | B2* | 6/2018 | Cuban | H04N 7/185 |
| 10,107,891 | B1* | 10/2018 | Ngo | G01S 5/0289 |
| 2004/0017312 | A1* | 1/2004 | Anderson | G01S 5/02 |
| | | | | 342/457 |
| 2006/0184292 | A1* | 8/2006 | Appleby | F41H 13/00 |
| | | | | 701/23 |
| 2007/0021880 | A1* | 1/2007 | Appleby | G05D 1/0088 |
| | | | | 701/23 |
| 2007/0299947 | A1* | 12/2007 | El-Damhougy | H04W 76/028 |
| | | | | 709/223 |
| 2012/0271461 | A1* | 10/2012 | Spata | G01W 1/00 |
| | | | | 700/276 |
| 2013/0162822 | A1* | 6/2013 | Lee | H04N 7/185 |
| | | | | 348/146 |
| 2014/0316616 | A1* | 10/2014 | Kugelmass | G05D 1/101 |
| | | | | 701/8 |
| 2015/0234387 | A1* | 8/2015 | Mullan | G05D 1/104 |
| | | | | 701/3 |
| 2016/0116915 | A1* | 4/2016 | Pulleti | G01S 13/56 |
| | | | | 701/3 |
| 2016/0327959 | A1* | 11/2016 | Brown | G08G 5/0069 |

OTHER PUBLICATIONS

Bennet, D.J. and C.R. McInnes,"Autonomous Three-Dimensional Formation Flight for a Swarm of Unmanned Aerial Vehicles," J. Guidance, Control, and Dynamics, vol. 34, No. 6, Nov.-Dec. 2011, pp. 1899-1908.

Clark, R. et al., "Autonomous Swarm Testbed with Multiple Quadcopters," Proceedings of the 1st World Congress of Unmanned Systems Engineering, 2014.

Cruz, Y.I., "An Algorithm for Autonomous Formation Obstacle Avoidance," Thesis for Master of Science in Aeronautics and Astronautics, University of Washington, 2013.

Fink, M. and C. Prada, "Acoustic Time-Reversal Mirrors," Institute of Physics Publishing, Inverse Problems, 17:R1-R38, 2001.

Kushleyev, A. et al., "Towards a Swarm of Agile Micro Quadrotors," GRASP Lab, University of Pennsylvania, 2013.

Lum, C. et al., "Formation Flight of Swarms of Autonomous Vehicles in Obstructed Environments Using Vector Field Navigation," University of Washington, 2012.

Ouellet D. et al., "Control of Swarms of Autonomous Robots Using Model Driven Development—A State-Based Approach," IEEE 2011, 8 pages.

Vasarhelvyi, G. et al., "Outdoor Flocking and Formation Flight with Autonomous Aerial Robots," MT-ELTE Research Group for Statistical and Biological Physics, Budapest, Hungary, 2014.

Xue, Z. and J. Zeng, "Formation Control Numerical Simulations of Geometric Patterns for Unmanned Autonomous Vehicles with Swarm Dynamical Methodologies," 2009 International Conference on Measuring Technology and Mechatronics Atuomation, 6 pages.

* cited by examiner

OBJECT DISCRIMINATION BASED ON A SWARM OF AGENTS

STATEMENT REGARDING FEDERALLY SPONSORED RESEARCH

The United States Government has rights in this invention pursuant to Contract No. DE-AC52-07NA27344 between the U.S. Department of Energy and Lawrence Livermore National Security, LLC, for the operation of Lawrence Livermore National Laboratory.

BACKGROUND

Many scientific, engineering, military, and other technologies seek to identify the type of an object that is hidden from view. For example, an object may be buried in the ground or be underwater, obscured by cloud cover, and so on. Some technologies detect the presence of buried objects such as landmines in a roadway or a field for military or humanitarian purposes. Such technologies may use ultra-wideband ground-penetrating radar ("GPR") antennas that are mounted as a linear array of sensors on the front of a vehicle that travels on the roadway or across the field. The antennas are directed into the ground. GPR systems can be used to detect not only metallic objects but also nonmetallic objects whose dielectric properties are sufficiently different from those of the soil. When a radar signal strikes a subsurface object, it is reflected back as a return signal to a receiver. Current GPR systems typically analyze the strength or amplitude of the return signals directly to identify the presence of the object.

Once a subsurface object is detected, it can be helpful to distinguish between objects of different types or classes. For example, a GPR system may detect the presence of both buried landmines and underground utility structures. If it cannot be determined whether a detected object is a landmine or a utility structure, then significant time and resources may be used trying to manually determine the type of the detected object. Although some approaches have had some success in distinguishing objects, it would be helpful if the accuracy of the process of distinguishing types of objects could be improved.

DETAILED DESCRIPTION

Figure 1A:
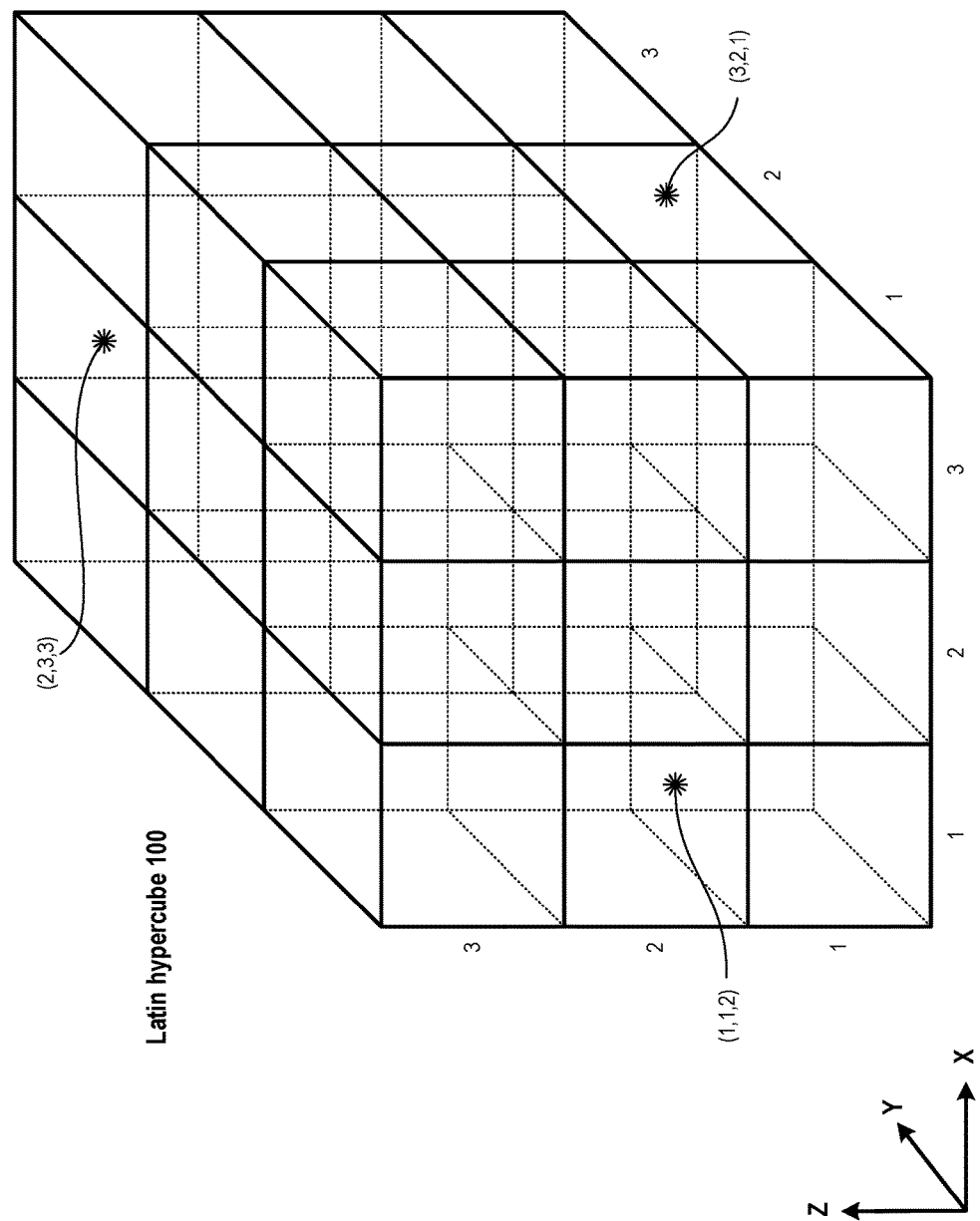
FIG. 1A is a diagram that illustrates a sample configuration within a Latin hypercube.

In some embodiments, an object discrimination ("OD") system is provided that employs a swarm of agents with sensors for determining an object type of an object. The agents may be unmanned vehicles ("UVs"), such as unmanned aerial vehicles ("UAVs") (e.g., quadcopters and other drones), unmanned underwater vehicles ("UUVs"), unmanned ground vehicles ("UGVs"), unmanned space vehicles ("USVs"), and so on. UVs can be controlled in various ways that range from autonomous control by a navigation system to remote control by an operator. Each agent may have one or more sensors such as transceivers for acquiring radar, acoustic, sonar, and other signals. When an object is detected (e.g., by the agents), the agents assume a configuration relative to the object and then collect sensor data that is used to identify the type of the object. For example, if the agents are UAVs, then when an underground object is detected, the agents assume a configuration in which one agent hovers directly above the detected object at a distance of one meter above the surface and the other agents hover at different heights above the surface of and different distances from the detected object. The agents then acquire data about the detected object, for example, by transmitting GPR signals and receiving the return signals. The OD system may have learned through a training process a configuration of agents that is well-suited to acquiring data that can be used to discriminate object types of interest. The OD system then analyzes the acquired data to determine the object type of the detected object. The analysis may involve extracting features from the acquired data that the OD system learned through the training process to be useful in discriminating the object types of interest.

In some embodiments, the OD system initially learns a target configuration of the agents (e.g., locations of the agents relative to the object) to use in identifying that an object is of a target object type based on suitability of the target configuration for discriminating the target object type from other object types. For example, one object type may be sphere-shaped, and another object type may be disc-shaped. To learn the target configuration, the OD system generates sample configurations for the agents. For example, if there are five agents, then the OD system may generate 20 sample configurations of locations within a volume that is a 10-meter cube. For each sample configuration, each agent is assigned a location within the volume. From the sample configurations, the OD system selects as the target configuration a sample configuration that is suitable to discriminate an object of a first object type from an object of a second object type. To select the target configuration, the OD system acquires sensor data for an object of the first object type and an object of the second object type for each sample configuration. For example, an object of the first object type may be buried underground. The OD system, for each sample configuration, may direct the agents to assume the sample configuration—that is, position themselves at the locations of the sample configuration. The OD system then directs the agents to acquire data relating to the buried object when in the sample configuration. For example, when using GPR, the agents may use a monostatic, multi-monostatic, or multistatic mode for transmitting signals and receiving return signals from the object of the first object type. The OD system then repeats the process to acquire sensor data for an object of the second object type for each of the 20 sample configurations. After the sensor data is collected, the OD system then analyzes the sensor data to identify a sample configuration that is suitable to discriminate an object of the first object type from an object of the second object type. For example, if the sensor data indicates for one sample configuration the return signal at a certain frequency has a weak signal strength for the object of the first object type but has a strong signal strength for the object of the second object type, then the OD system may select the sample configuration as the target configuration and select the strength of the signal of that frequency (e.g., discriminating frequency) that is acquired when in the target configuration to indicate the object type.

In some embodiments, after a target configuration is selected to identify object of different object types, the OD system allows objects of the first object type and the second object type to be distinguished using the target configuration. For example, when a buried object is detected, the OD system may direct the agents to assume the target configuration. The OD system then directs the agent to acquire sensor data, such as the return signals from GPR. The OD system then analyzes the sensor data to determine whether the object is of the first object type or the second object type. For example, if the sensor data has a weak signal strength for the discriminating frequency, the OD system may indicate that the object is of the first object type. In contrast, if the sensor data has a strong signal strength for the discriminating frequency, the OD system may indicate that the object is of the second object type.

The OD system overcomes some of the limitations of prior sensor arrays in that the agents can assume configurations that are not limited to being a fixed distance apart, a fixed height above the ground, co-linear, co-planar, and so on. Because of the fixed nature of prior sensor arrays, they could not be bent or folded, negotiate small transitions, or expand to cover large expanses. In addition, the OD system allows for modifying sensor array resolutions through the use of variable apertures. Because a target configuration can specify locations of different heights and distances from an object, the OD system provides considerable flexibility in determining a target configuration that is suitable for discriminating object types by use of a training phase to automatically identify a configuration that is well-suited to determine the object type of an object.

In some embodiments, the OD system may use various techniques to identify the sample configurations from which to select the target configuration. In general, the number of possible configurations of agents may be so large that it would be infeasible to test all possible configurations. For example, if there are five agents, the volume is a 10-meter cube, and the agents are to be positioned within one-meter sub-cubes, then the number of possible configurations is on the order of $10^{15}$. Some of the possible configurations may, however, be undesirable. For example, if the target object is underground, then a configuration in which all agents are immediately above each other and directly above the target object would likely not be an effective configuration. Although the OD system could randomly select some number of configurations as sample configurations, the sample configuration may not represent a good spread across the space of possible configurations. Thus, in some embodiments, the OD system may use various design-of-experiments ("DOE") techniques to generate the sample configurations. Suitable DOE techniques include central composite techniques, Box-Behnken techniques, random techniques, Plackett-Burman techniques, Taguchi techniques, Halton, Faure, and Sobel sequences techniques, Latin hypercube techniques, and so on. (See Cavazzuti, M., "Optimization Methods: From Theory to Design," Springer-Verlag Berlin Heidelberg, 2013, chap. 2, pp. 13-56, which is hereby incorporated by reference.) The Latin hypercube technique has the characteristic that it generates samples in which each row (x), column (y), and height (z) has at most one volume that is selected. For example, when a Latin hypercube technique is used to generate the sample configurations, the parameters may be the x, y, and z axes (e.g., east-west, north-south, and height) and the levels may be five (e.g., the case of five agents). In such a case, the Latin hypercube technique will generate sample configurations within a 5×5×5 cube. Each sample specifies five sub-cubes (e.g., (1, 3, 2), (2, 2, 1), (3, 1, ), (4, 4, 4), (5, 5, 3)) that correspond to the locations of the five agents within a volume. The OD system maps the locations within the sub-cubes to locations within a volume relative to a detected object. For example, the OD system may map the five sub-cubes to locations that are within one-meter sub-volumes of a 10-meter cubic volume. The OD system may specify a separation criterion (e.g., minimum distance between agents) to ensure that the agents within the volume are not too close to each other. In such a case, the OD system checks each sample configuration and discards those that do not satisfy the separation criterion.

In some embodiments, a configuration system may use principles of the OD system to more generally determine a target configuration for agents to acquire data that is unrelated to discriminating object types. For example, the configuration system may be used to determine a target configuration for agents that are nodes in a communications network. The agents may be UAVs (and UGVs) that include transceivers for providing a communications network for communication devices. For example, in a military environment, each soldier may have a low-power communications device for communicating with other solders in the vicinity. The communications devices may be, for example, low power to minimize the chance of communications being detected. The communications devices may also be used in harsh or interfering environments. To allow one communications device to communicate with another, the agents may be positioned above the soldiers to receive communications from and forward communications to the communications devices. As another example, the agent may provide cellular coverage for an area that normally does not have cellular coverage, such as at an annual gathering at a remote desert location. In such an example, the agents may communicate with cellphones and a base station. The base station may be at a fixed location in the area and provide a satellite connection. As the environment (e.g., buildings, terrain) can affect the quality of the communications, the configuration system may test various sample configurations of the agents to select a target configuration that provides acceptable coverage for the communications devices. To select a target configuration, the configuration system may generate sample configurations (e.g., using a DOE technique) for the agents. The configuration system then tests the sample configurations until one is identified that provides an acceptable coverage. To test a sample configuration, the configuration system directs the agents to assume the sample configuration and then evaluates the coverage for the communications devices. The evaluation of the coverage may assess whether each communication device can communicate with at least one agent and whether each agent can communicate with at least one other agent. The configuration system selects as the target configuration a sample configuration that provides acceptable coverage.

In some embodiments, when in a current target configuration, a communications network may detect a change for which the current target configuration of the agents may no longer provide acceptable coverage. For example, a communications device may be moved outside of the area of effective coverage or a new communications device on the periphery of the coverage may be detected. In such a case, the configuration system may be used to generate and test sample configurations until one is identified that provides acceptable coverage for the communications devices.

In some embodiments, the OD system may employ singular value decomposition to identify one or more features of return signals that are well-suited to distinguish objects of different object types. After the OD system collects the return signals from objects of different object types for a sample configuration, the OD system may use singular value decomposition to extract features from the return signals and then identifies a feature or features that are well-suited to discriminating objects of different object types. For example, a feature that has a low value for one object type and a high value for another object type may be useful in discriminating those object types. As another example, the OD system may determine that four different frequencies are useful to discriminate objects of five different object types. In such a case, a certain object type may be identified if the strength of the three lower frequencies is high and the strength of the highest frequency is low. If none of the extracted features for a sample configuration is well-suited for discriminating object types, then the OD system disregards that sample frequency. (See, U.S. Pat. No. 8,717,223, entitled "Classification of Subsurface Objects Using Singular Values Derived from Single Frames" and U.S. Pat. No. 8,766,845, entitled "Object Detection with a Multistatic Array Using Singular Value Decomposition," which are both incorporated by reference.) Alternatively, the OD system may generate 3D images from the return signals and identify features of the images that are well-suited to discriminate between object types.

In some embodiments, the OD system may, after collecting the return signals for a configuration, use a Fourier transform to convert each return signal from the time domain to the frequency domain. For example, M return samples of each return signal may be converted into L frequencies resulting in $N^2$ frequency return signals where N is the number of transmitter and receiver pairs. The OD system then may use matrix A for each frequency with a row for each transmitter and a column for each receiver with the values of the matrix set to the values from the corresponding frequency return signals at the frequency of that matrix. The OD system then generates the singular values for each frequency by performing a singular value decomposition on each matrix A as indicated by the following equation:

$$A = USV^*$$

where S is a diagonal matrix containing $J_O$ singular values, U is a matrix whose $J_O$ columns contain orthogonal receiver singular vectors, V is a matrix whose $J_O$ columns contain orthogonal transmitter singular vectors, and $J_O$ is the smaller of the number of transmitters or receivers. The OD system thus generates L sets of singular values, one for each frequency. The OD system may also use the first singular values or the second singular values or both as the extracted features. (See Fink, M. and Prada, C., "Acoustic Time-Reversal Mirrors," Institute of Physics Publishing, Inverse Problems, 17:R1-R38, 2001.)

In some embodiments, the OD system may be used to discriminate object types of objects that are underwater. For example, a navy may want to identify any unidentified underwater vehicles that may pose a threat to ships that are in port or at sea. When an unidentified underwater vehicle is detected, the OD system may direct a swarm of agents that are UUVs (e.g., torpedo-shaped) to assume a target configuration surrounding the unidentified underwater vehicle. The OD system may then direct the agents to take sonar readings. The OD system then analyzes the sonar readings to identify the type of the object. The OD system may have learned the target configuration by collecting sonar readings from examples of underwater vehicles that may pose a threat.

In some embodiment, a configuration system may employ a configuration of agents that not only specifies the spatial arrangement of the agents, but also specifies one or more characteristics of sensors. For example, one such characteristic is polarization. Some sensors can operate at different polarizations based on their configuration settings such as operating with a vertical polarization or a horizontal polarization. So, a transceiver may be configured to operate the transmitter with a vertical polarization and the receiver with a horizontal polarization. The polarization of the sensor can be considered a fourth dimension that is in addition to the three spatial dimensions. So, the configuration system can learn a target configuration that specifies, for each agent, its locations and its polarization by generating sample configurations that specify the location and polarization of each agent, acquiring sensor data for each sample configuration, and selecting as the target configuration the sample configuration that is optimal for the desired objective (e.g., object discrimination or communications coverage). Other characteristics of sensors that are configurable can be used such as frequency bandwidth, modality (e.g., radar or acoustic), and so on. The configuration system may employ multiple characteristics of sensors or more generally configurable characteristics of agents. In such a case, the configuration space would have five or more dimensions. For example, the fourth dimension may be polarization, and the fifth dimension may be frequency bandwidth.

FIG. 1A is a diagram that illustrates a sample configuration within a Latin hypercube. The Latin hypercube 100 is a 3×3×3 cube representing three parameters x, y, and z and three levels representing three agents. In this sample configuration, the agents are located within sub-cubes (1, 1, 2), (2, 3, 3), and (3, 2, 1). Other sample configurations would include agents in (1, 1, 1), (2, 2, 2), and (3, 3, 3), in (1, 2, 3), (2, 1, 1), and (3, 3, 2), and so on. The OD system may discard those sample configurations that do not satisfy the separation criterion. For example, the separate criterion may specify that the agents cannot be in neighboring sub-cubes or, stated differently, may specify the minimum distance between agents must be greater than $\sqrt{3}$. With a separation criterion, the sample configuration of (1, 1, 1), (2, 2, 2), and (3, 3, 3) would not satisfy the separation criterion, but the other two sample configurations above would satisfy the separation criterion. The OD system may use a separation criterion for various reasons. For example, a separation criterion may be used to ensure that agents have sufficient space to hover given possible weather conditions (e.g., high wind). As another example, a separation criterion may be used to ensure that the agents are distributed through the Latin hypercube.

In some embodiments, the OD system maps a sample configuration to a physical volume that includes more sub-volumes than sub-cubes of the Latin hypercube. For example, if the Latin hypercube is 3×3×3 and the volume is 9×9×9, then each sub-cube would map to 27 sub-volumes. In such a case, the OD system may randomly select one of the 27 sub-volumes corresponding to a sub-cube and locate that agent in that sub-volume, rather than in the sub-volume at the center of the 27 sub-volumes. In such a case, the OD system may use a separation criterion based on the actual physical distance between agents to ensure, for example, that randomly selected sub-volumes are not too close together.

Figure 1B:
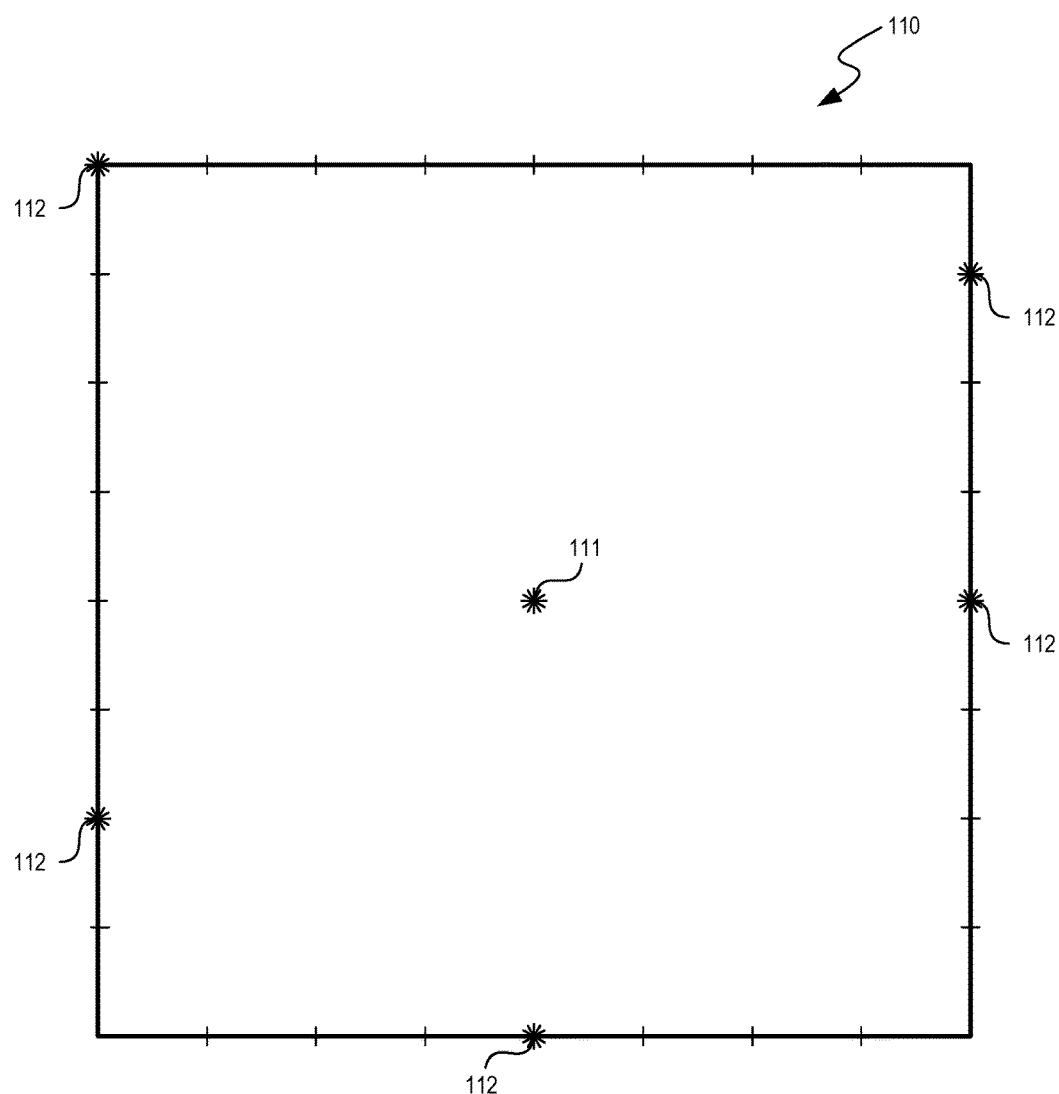
FIG. 1B is a diagram that illustrates a sample configuration with a center agent and perimeter agents.

FIG. 1B is a diagram that illustrates a sample configuration with a center agent and perimeter agents. In some application, the OD system may use agents that are co-planar with a center agent 111 located in the center of an area 110 and perimeter agents 112 located on the perimeter of the area. To generate sample configurations, the OD system may randomly select a location on the perimeter for each perimeter agent. The OD system may use a separation criterion to ensure that the randomly selected locations are not too close together. The area or volume in which agents are to be positioned is referred to as a space.

Figure 2:
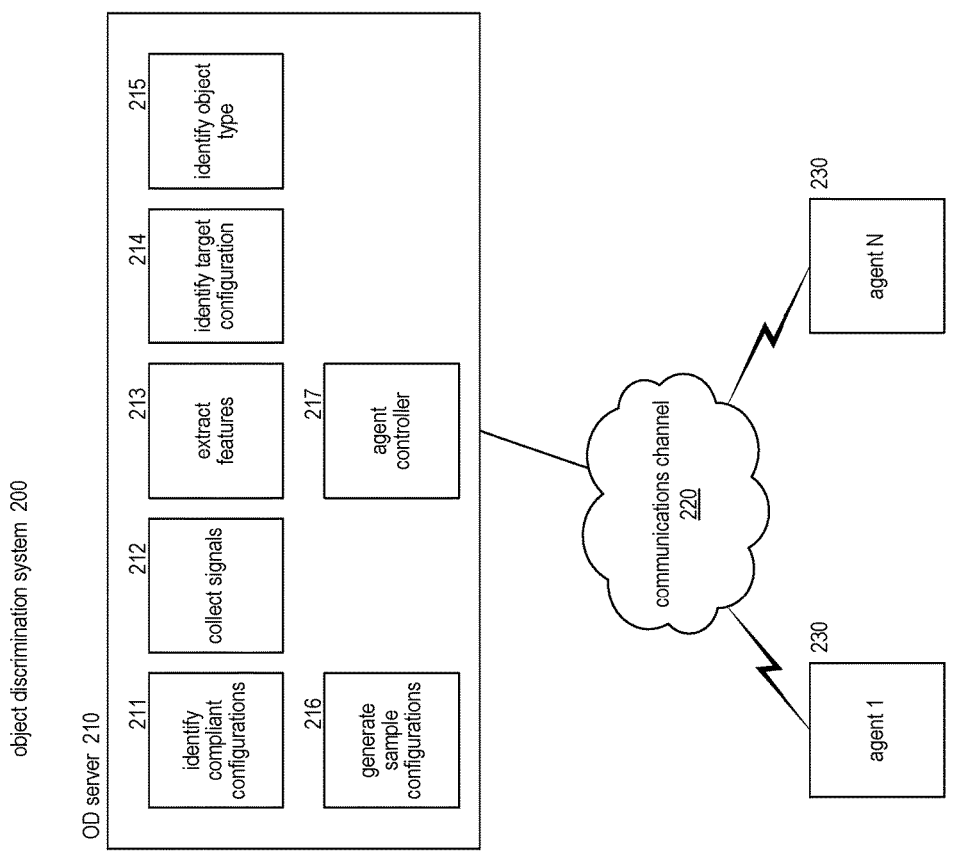
FIG. 2 is a block diagram illustrating components of an object discrimination system in some embodiments.

FIG. 2 is a block diagram illustrating components of an object discrimination system in some embodiments. An object discrimination system 200 includes an OD server 210 that communicates with agents 230 via communications channel 220. The server includes an identify compliant configurations component 211, a collect signals component 212, an extract features component 213, an identify target configuration component 214, an identify object type component 215, a generate sample configurations component 216, and an agent controller component 217. The identify compliant configurations component is invoked to identify sample configurations that satisfy the separation criterion. The collect signals component is invoked to collect signals for each of the configurations when the agents assume that configuration. The extract features component is invoked to extract features from the signals for use in identifying the target configuration. The identify target configuration component analyzes the feature values to identify a target configuration. The identify object type component is invoked to direct the agents to assume a target configuration, to collect signals, and to discriminate between object types. The generate sample configurations component is invoked to generate sample configurations for the agents. The agent controller component communicates with the agents to direct them to assume a configuration and collect signals based on that configuration. In some embodiments, aspects of the OD server may be implemented on the agents in a distributed manner. For example, each agent may extract features from its return signal and supply the extracted features, rather than the return signals, to the OD server.

The computing systems on which the OD system may be implemented may include a central processing unit, input devices, output devices (e.g., display devices and speakers), storage devices (e.g., memory and disk drives), network interfaces, graphics processing units, accelerometers, cellular radio link interfaces, global positioning system devices, and so on. The computing systems may include servers of a data center, massively parallel systems, and so on. The computing systems may access computer-readable media that include computer-readable storage media and data transmission media. The computer-readable storage media are tangible storage means that do not include a transitory, propagating signal. Examples of computer-readable storage media include memory such as primary memory, cache memory, and secondary memory (e.g., DVD) and other storage. The computer-readable storage media may have recorded on them or may be encoded with computer-executable instructions or logic that implements the OD system. The data transmission media are used for transmitting data via transitory, propagating signals or carrier waves (e.g., electromagnetism) via a wired or wireless connection.

The OD system may be described in the general context of computer-executable instructions, such as program modules and components, executed by one or more computers, processors, or other devices. Generally, program modules or components include routines, programs, objects, data structures, and so on that perform particular tasks or implement particular data types. Typically, the functionality of the program modules may be combined or distributed as desired in various embodiments. Aspects of the OD system may be implemented in hardware using, for example, an application-specific integrated circuit (ASIC).

Figure 3:
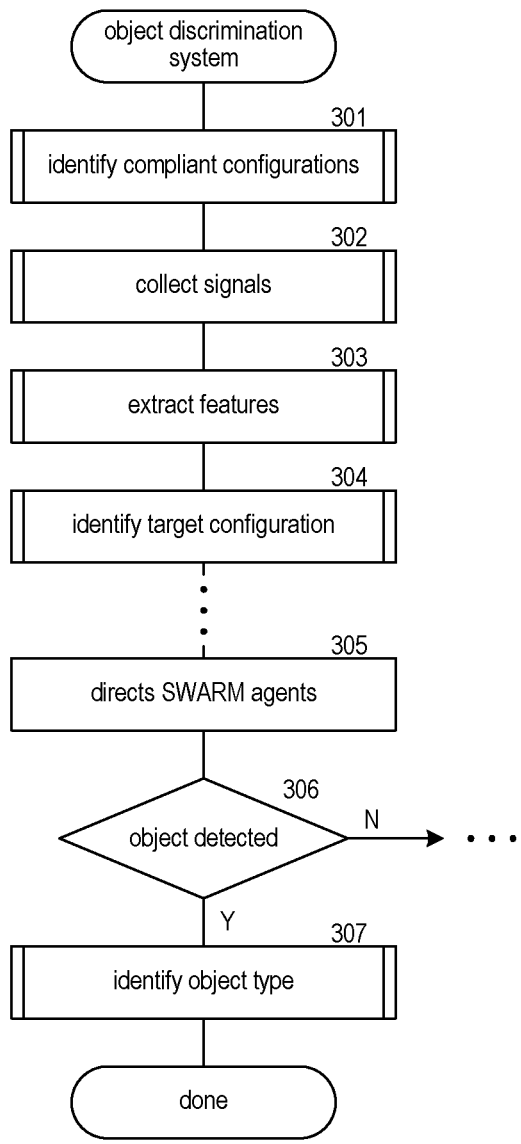
FIG. 3 is a flow diagram that illustrates the overall processing of an object discrimination system in some embodiments.

FIG. 3 is a flow diagram that illustrates the overall processing of an object discrimination system in some embodiments. An OD system 300 identifies one or more target configurations for discriminating objects and directs a swarm of agents to assume a target configuration and collect data for discriminating one object type from another. In block 301, the OD system invokes an identify compliant configurations component to identify those sample configurations that satisfy a separation criterion. In block 302, the OD system invokes a collect signals component to direct the agents to assume a configuration and collect sensor data. In block 303, the OD system invokes an extract features component to extract features from the return signals for use in discriminating objects. In block 304, the OD system invokes an identify target configuration component to identify a target configuration. In block 305, the OD system may direct a swarm of agents to scan an area trying to detect an object. In decision block 306, if an object is detected, then in block 307, the OD system invokes an identify object component to identify the object type of the object that has been detected and then completes. In some embodiments, the OD system may identify multiple target configurations where, for example, each target configuration may be well-suited to identify objects of a certain object type. In such a case, the OD system may direct the agents to assume each target configuration in sequence and collect signals when in that target configuration.

Figure 4:
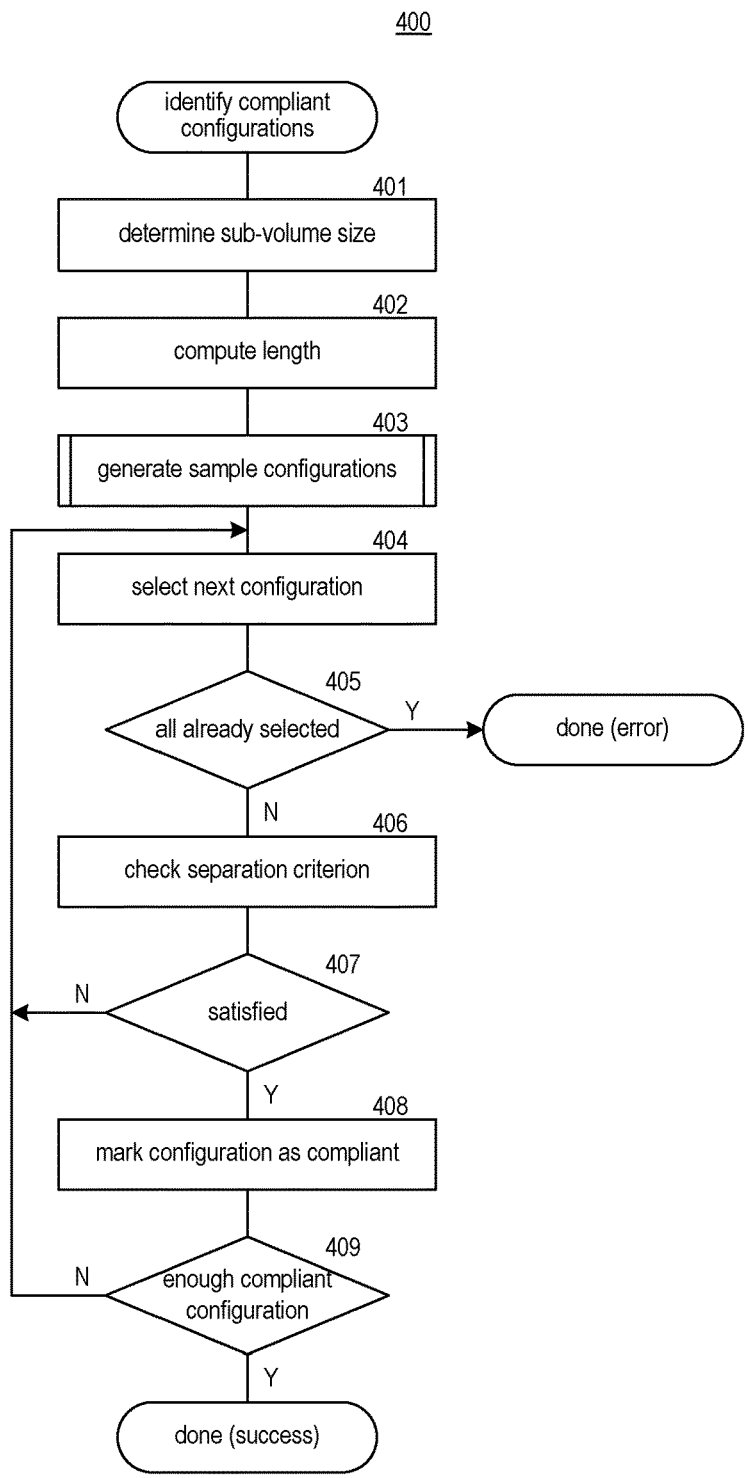
FIG. 4 is a flow diagram that illustrates processing of an identify compliant configurations component in some embodiments.

FIG. 4 is a flow diagram that illustrates processing of an identify compliant configurations component in some embodiments. An identify compliant configurations component 400 generates sample configurations and ensures that the sample configurations satisfy the separation criterion. The component accesses an indication of the width and height of the volume, the sizes of the agents, and the number of agents. The agents may be homogeneous in the sense they each perform the same function and are the same size. Alternatively, the agents may be heterogeneous in the sense that they perform different functions or are different sizes. For example, heterogeneous agents may include one agent whose function is to transmit signals and multiple agents whose functions are to receive the return signals. In block 401, the component determines the size of the sub-volumes within the volume. For example, if the agents are homogeneous, then the component may use the height, width, and length of an agent as the sub-volume size. If the agents are heterogeneous, then the component may use the maximum height, maximum width, and maximum length of an agent as the sub-volume size. The component may also determine the sub-volume size to allow for additional space around an agent. In block 402, the component computes the length of the volume so that it is large enough to accommodate one agent in sub-volume along the length. The OD system may set the width and height of the volume based on the characteristics of the environment in which the agents are to operate. For example, the agents may be attempting to detect an object that is buried below a street that has tall buildings on its sides. In such a case, the OD system may set the width based on the distance between the buildings and height based on a maximum height for effective sensing and then determines the appropriate length of the volume. In block 403, the component invokes a generate sample configurations component to generate sample configurations. In blocks 404-409, the component loops identifying the sample configurations that satisfy the separation criterion. In block 404, the component selects a sample configuration. In decision block 405, if all the sample configurations have already been selected, then the component returns an indication that not enough compliant sample configurations have been identified, else the component continues at block 406. In block 406, the component checks the separation criterion for the selected sample configuration. In decision block 407, if the separation criterion is satisfied for the selected sample configuration, then the component continues at block 408, else the component loops to block 404 to select the next sample configuration. In block 408, the component marks the selected sample configuration as compliant. In decision block 409, if enough compliant sample configurations have been identified, then the component returns an indication of success, else the component loops to block 404 to select the next sample configuration.

Figure 5:
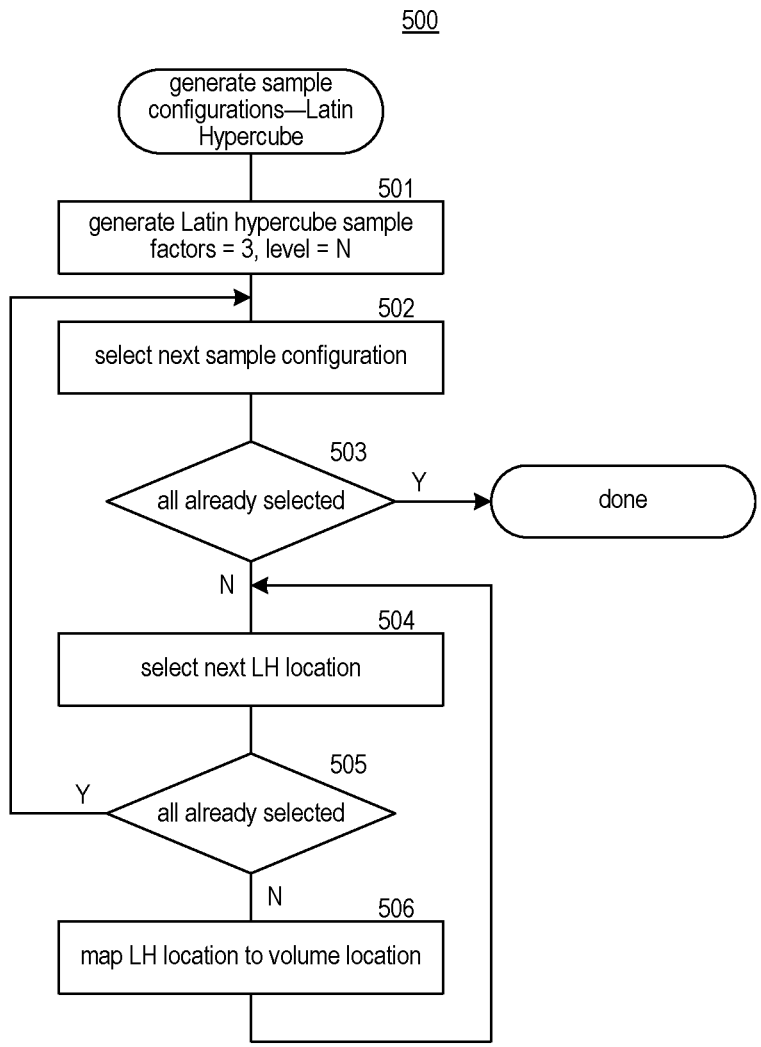
FIG. 5 is a flow diagram that illustrates processing of a generate sample configurations component based on a Latin hypercube in some embodiments.

FIG. 5 is a flow diagram that illustrates processing of a generate sample configurations component based on a Latin hypercube in some embodiments. A generate sample configurations component 500 generates sample configurations using a Latin hypercube technique. In block 501, the component generates some number of Latin hypercubes to represent sample configurations using three factors and a number of levels that is equal to the number of agents. The dimensions of the Latin hypercube may be in the range of 0 to 1 with sub-divisions with a size of one over the number of levels. In blocks 502-506, the component loops mapping the locations of the Latin hypercube locations within the volume. In block 502, the component selects the next sample configuration. In decision block 503, if all the sample configurations have already been selected, then the component completes, else the component continues at block 504. In block 504, the component selects the next location of the sample configuration. In decision block 505, if all the locations have already been selected, then the component loops to block 502 to select the next sample configuration, else the component continues at block 506. In block 506, the component maps the location within the Latin hypercube to a location within the volume and then loops to block 504 to select the next location of the Latin hypercube.

Figure 6:
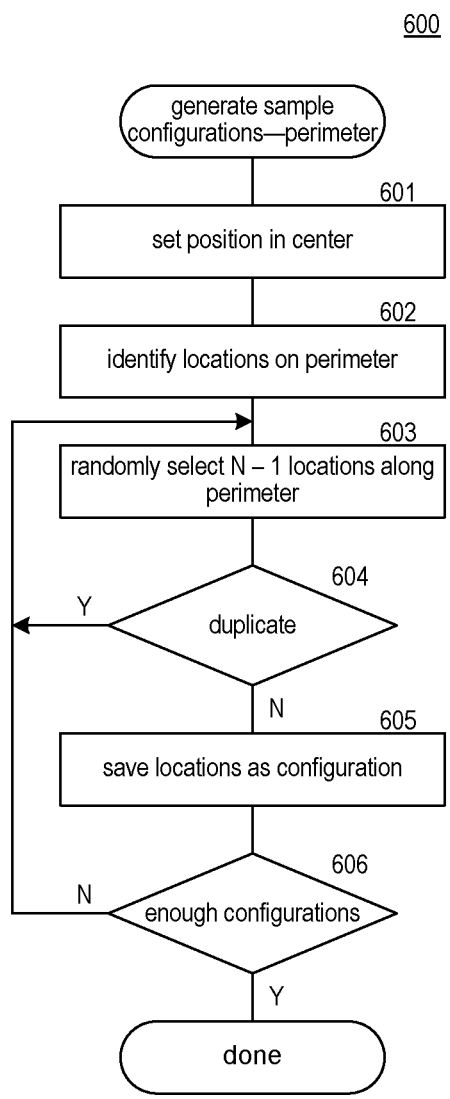
FIG. 6 is a flow diagram that illustrates processing of a generate sample configurations component based on a perimeter in some embodiments.

FIG. 6 is a flow diagram that illustrates processing of a generate sample configurations component based on a perimeter in some embodiments. A generate sample configurations component 600 is invoked to generate sample configurations in which one agent is located in the center of an area and the other agents are located on the perimeter of the area. In block 601, the component identifies the location in the center of the area, In block 602, the component identifies the locations on the perimeter. In blocks 603-606, the component loops generating sample configurations. In block 603, the component randomly selects a set of distinct locations along the perimeter that is one less than the number of agents. The component may also ensure that the locations satisfy a separation criterion. In decision block 604, if the randomly selected locations are duplicates of previously selected locations, then the component loops to block 603 to select another set of locations, else the component continues at block 605. In block 605, the component saves the locations (e.g., center location and randomly selected locations) as a sample configuration. In decision block 606, if enough sample configurations have been identified, then the component completes, else the component loops to block 603 to generate another sample configuration.

Figure 7:
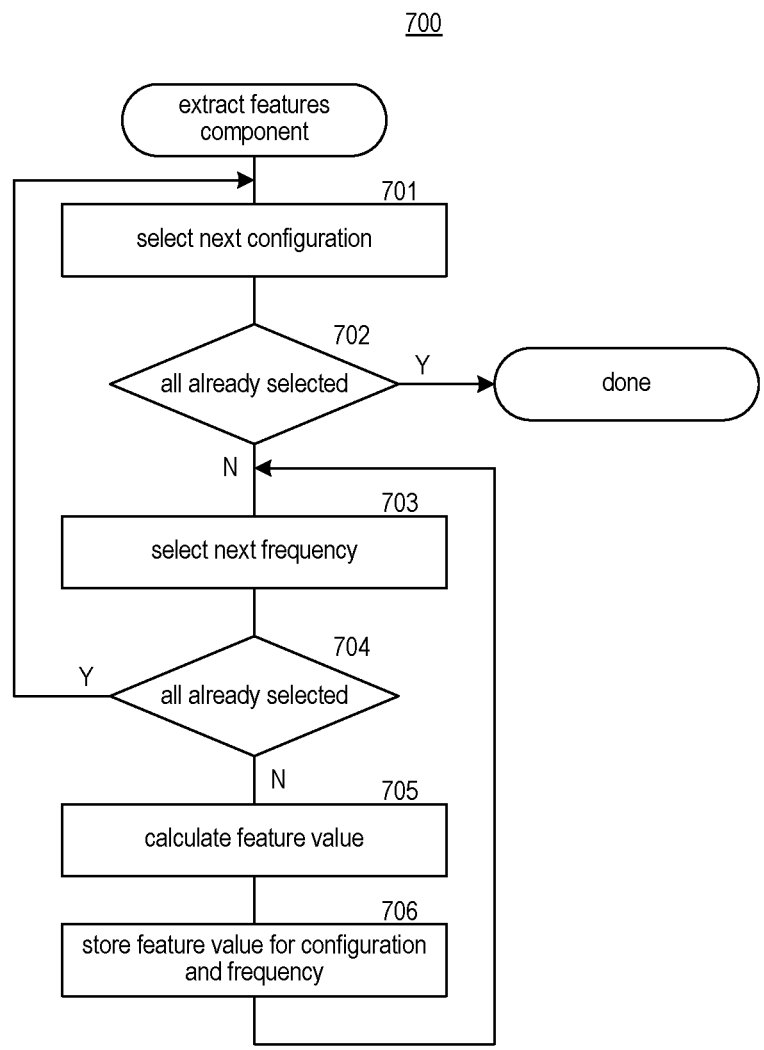
FIG. 7 is a flow diagram that illustrates processing of an extract features component in some embodiments.

FIG. 7 is a flow diagram that illustrates processing of an extract features component in some embodiments. An extract features component 700 is invoked to extract features from the return signals. The component may convert the return signals from a time domain to a frequency domain. In block 701, the component selects the next sample configuration, In decision block 702, if all the sample configurations have already been selected, then the component completes, else the component continues at block 703. In block 703, the component selects the next frequency for the sample configuration. In decision block 704, if all the sample frequencies have already been selected, then the component loops to block 701 to select the next sample configuration, else the component continues at block 705. In block 705, the component calculates the feature value (e.g., singular value) for the selected frequency. In block 706, the component stores the feature value for the sample configuration and frequency and then loops to block 703 to select the next frequency.

Figure 8:
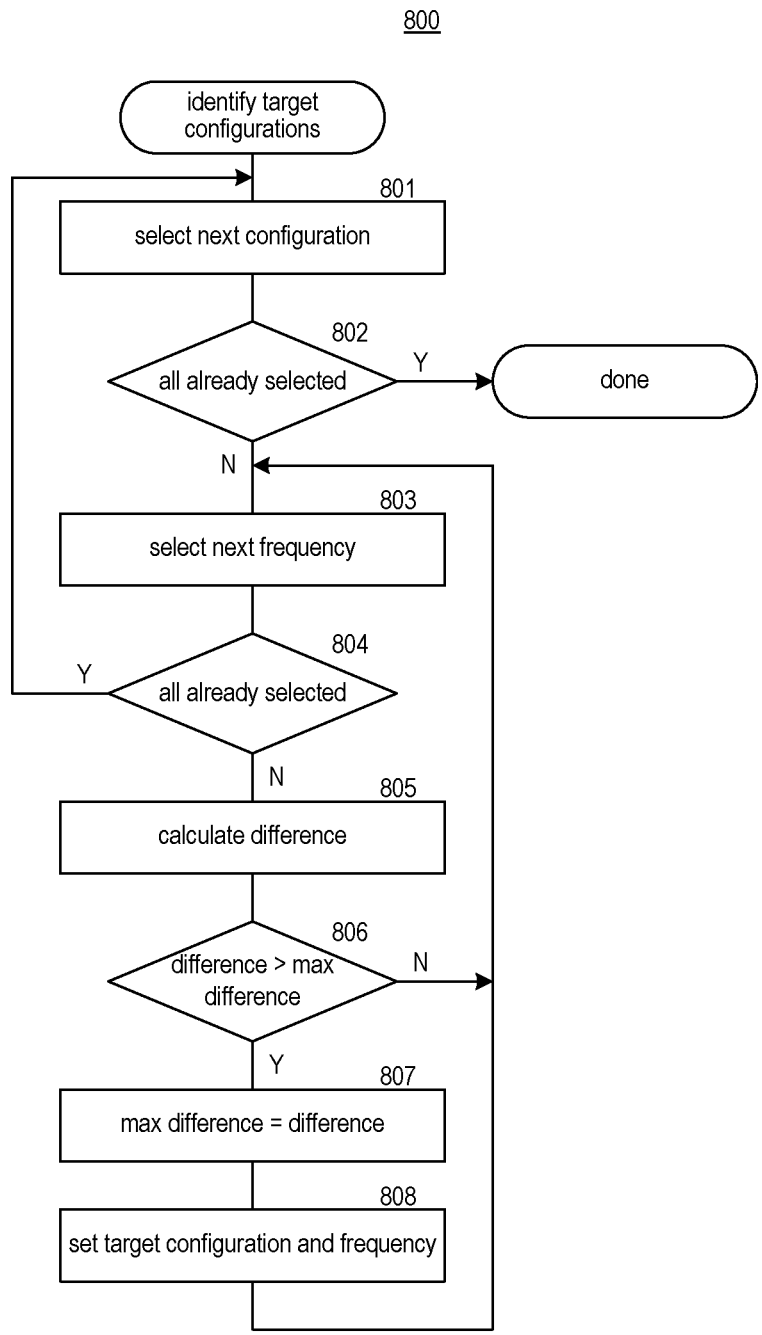
FIG. 8 is a flow diagram that illustrates the processing of an identify target configuration component in some embodiments.

FIG. 8 is a flow diagram that illustrates the processing of an identify target configuration component in some embodiments. An identify target configuration component 800 identifies a target configuration and a target frequency to discriminate one object type from another object type. In block 801, the component selects the next sample configuration. In decision block 802, if all the sample configurations have already been selected, then the component returns an indication of the target configuration and the target frequency, else the component continues at block 803. In block 803, the component selects the next frequency of the sample configuration. In decision block 804, if all the frequencies have already been selected, then the component loops to block 801 to select the next sample configuration, else the component continues at block 805. In block 805, the component calculates the difference between the feature values for the object types for the selected sample configuration and selected frequency. In decision block 806, if the calculated difference is greater than the maximum difference encountered so far, then the component continues at block 807, else the component blocks loops to block 803 to select the next frequency. In block 807, the component sets the maximum difference between the feature values to the calculated difference. In block 808, the component sets the target configuration and target frequency to the selected sample configuration and selected frequency and then loops to block 803 to select the next frequency.

Figure 9:
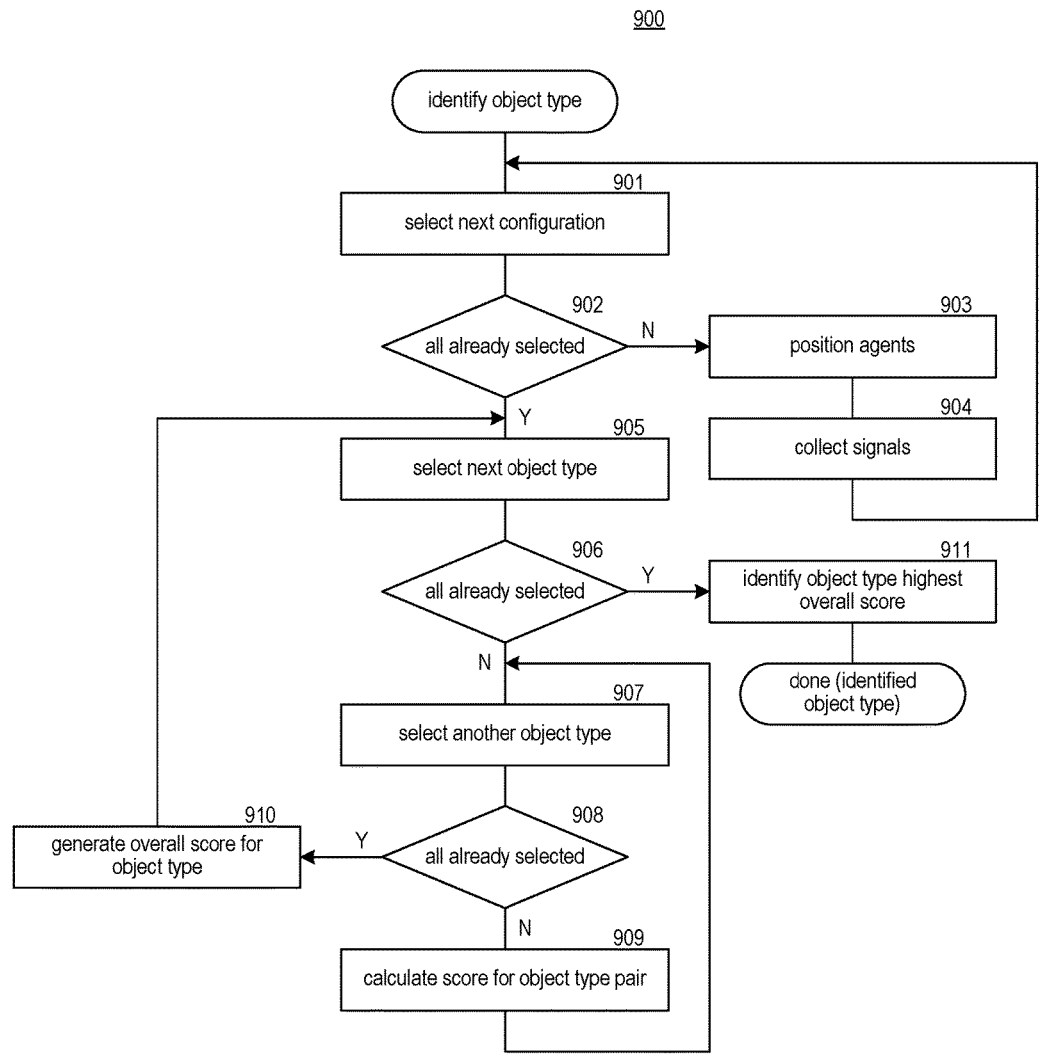
FIG. 9 is a flow diagram that illustrates processing of an identify object type component in some embodiments.

FIG. 9 is a flow diagram that illustrates processing of an identify object type component in some embodiments. An identify object type component 900 is invoked to direct the agents to assume various configurations and collect signals. The component then analyzes the results to identify the object type. In blocks 901-904, the component loops directing the agents to collect the signals. In block 901, the component selects the next target configuration. Each pair of object types may have a separate target configuration that is suitable to discriminate objects of those object types. In decision block 902, if all the target configurations have already been selected, then the component continues at block 905, else the component continues at block 903. In block 903, the component directs the agents to assume the target configuration. In block 904, the component directs the agents to collect signals and then loops to block 901 to select the next target configuration. In block 905, the component selects the next object type. In decision block 906, if all the object types have already been selected, then the component continues at block 911, else the component continues at block 907. In blocks 907-909, the component loops selecting each other object type. In block 907. the component selects another object type. In decision block 908, if all the other object types have already been selected, then the component continues at block 910, else the component continues at block 909. In block 909, the component calculates a score for the selected object type pair (i.e., the selected object type and the selected other object type) and then loops to block 907 to select another object type. In block 910, the component generates an overall score for the selected object type and then loops to block 905 to select the next object type. In block 911, the component identifies the object type with the highest overall score and then returns an indication of that object as the identified object.

Figure 10:
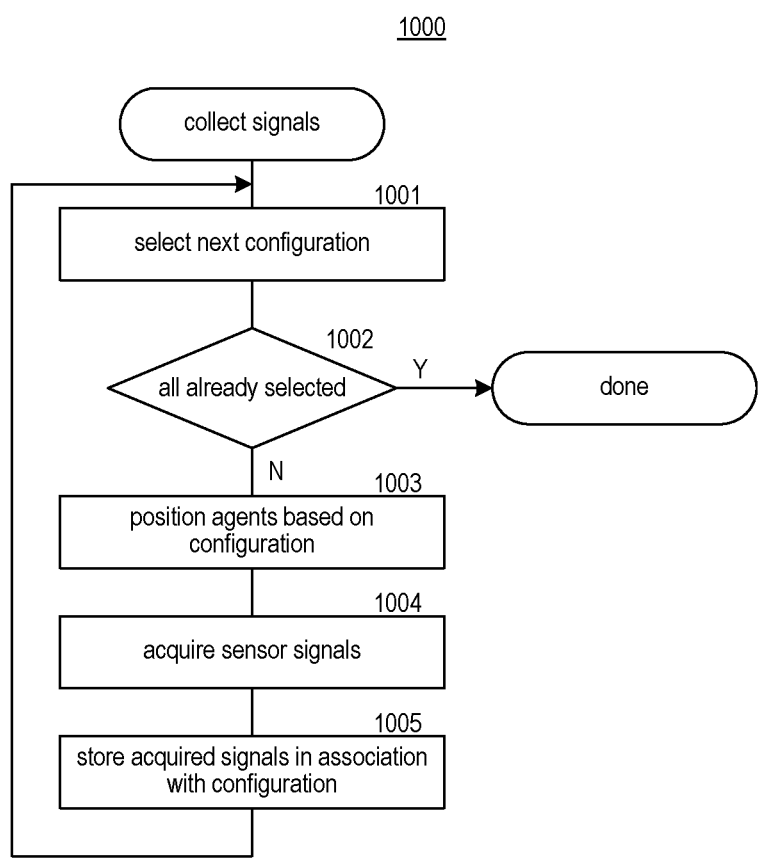
FIG. 10 is a flow diagram that illustrates processing of a collect signals component in some embodiments.

FIG. 10 is a flow diagram that illustrates processing of a collect signals component in some embodiments. A collect signals component 1000 is invoked to acquire sensor signals for various sample configurations. In block 1001, the component selects the next sample configuration. In decision block 1002, if all the sample configurations have already been selected, then the component completes, else the component continues at block 1003. In block 1003, the component positions the agents based on the sample configuration. In block 1004, the component acquires the sensor signals from the agents. In block 1005, the component stores the acquired signals in association with the selected sample configuration and then loops to block 1001 to select the next sample configuration. In some embodiments, the signals may be acquired using a computer program that estimates return signals from an object of a certain object type. The computer program may simulate the transmitting of signals from the agents in a sample configuration, the generating of the return signals based on the characteristics of the object, the interactions of the transmitted and return signals, and the return signals that would be received by the agents.

Figure 11:
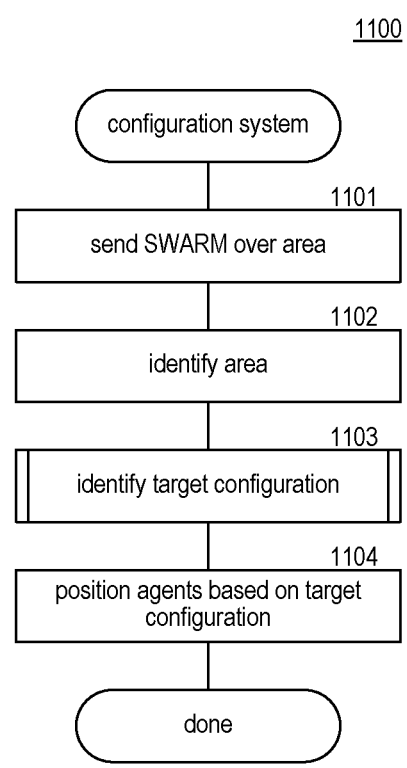
FIG. 11 is a flow diagram that illustrates processing of a configuration system in some embodiments.

FIG. 11 is a flow diagram that illustrates processing of a configuration system in some embodiments. A configuration system 1100 may be adapted to provide a communications network. In block 1101, the configuration system may send a swarm of agents over an area to identify the locations of the communications devices, In block 1102, the component identifies an area that bounds the communications devices. In block 1103, the component invokes an identify target configuration component to identify a target configuration that is well-suited to providing communications network coverage for the area. In block 1104, the component directs the agents to assume the target configuration.

Figure 12:
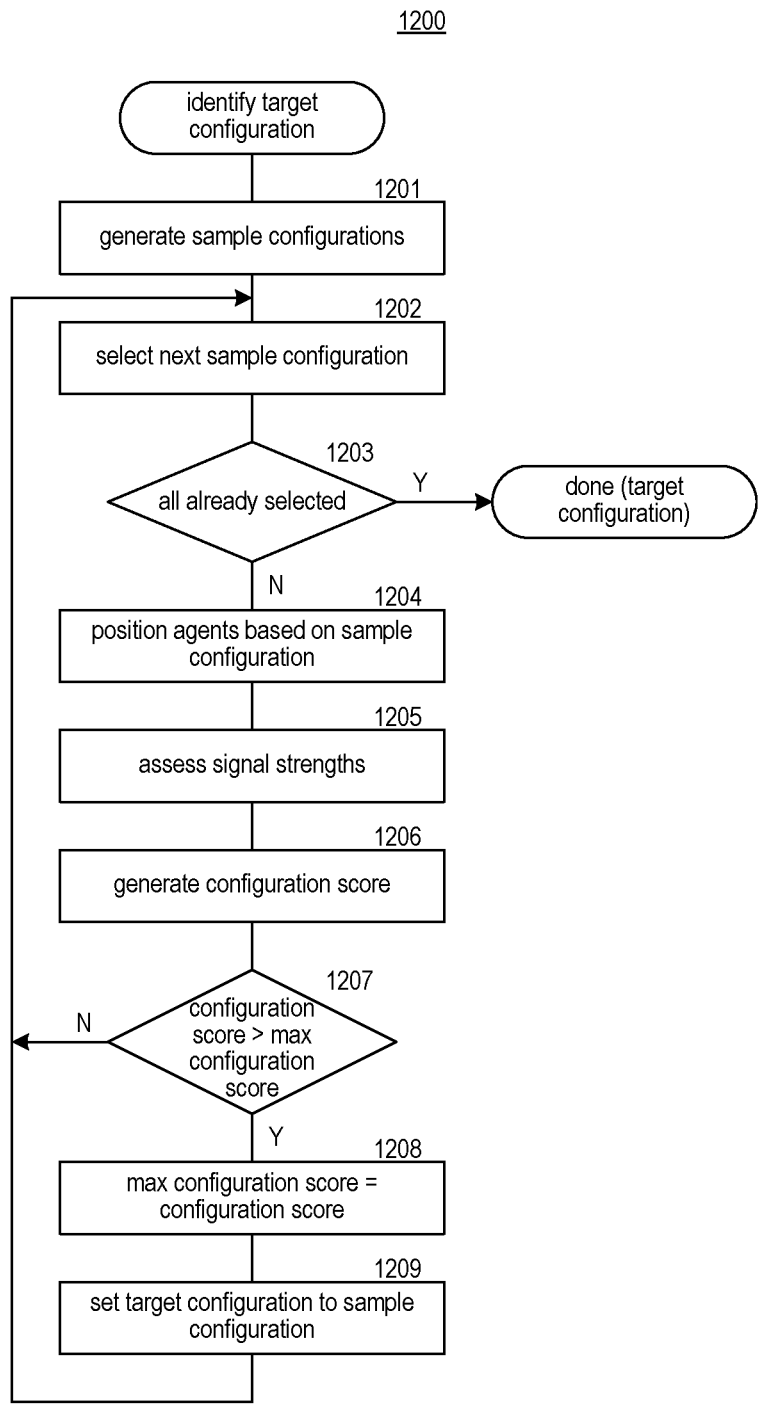
FIG. 12 is a flow diagram that illustrates processing of an identify target configuration component in some embodiments.

FIG. 12 is a flow diagram that illustrates processing of an identify target configuration component in some embodiments. An identify target configuration component 1200 is invoked to identify a target configuration. The identify target configuration component may be used to identify target configurations for a variety of uses such as in object discrimination, communications network support, tracking multiple objects, and so on. In block 1201, the component generates sample configurations, for example, using a Latin hypercube technique. In blocks 1202-1209, the component loops testing each sample configuration. In block 1202, the component selects the next sample configuration. In decision block 1203, if all the sample configurations have already been selected, the component returns an indication of the target configuration, else the component continues at block 1204. In block 1204, the component positions the agent based on the selected sample configuration. In block 1205, the component assesses the signal strengths received by the agents. In block 1206, the component generates a configuration score for the selected sample configuration. For example, the configuration score may indicate the effectiveness of the agents at serving as a communications network within the selected sample configuration. More generally, a configuration score indicates the effectiveness of the sample configuration at achieving the objective of the agents. In decision block 1207, if the calculated configuration score is greater than the maximum configuration score that has been encountered, then the component continues at block 1208, else the component loops to block 1202 to select the next sample configuration. In block 1208, the component sets the maximum configuration score to the calculated configuration score. In block 1209, the component sets the target configuration to the selected sample configuration and then loops to block 1202 to select the next sample configuration.

Figure 13:
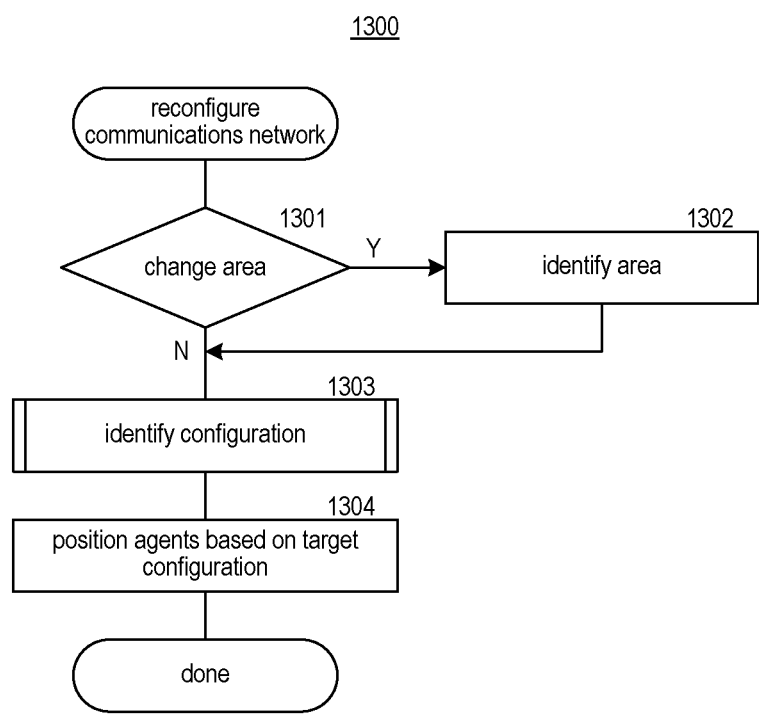
FIG. 13 is a flow diagram that illustrates processing of a reconfigure communications network component in some embodiments.

FIG. 13 is a flow diagram that illustrates processing of a reconfigure communications network component in some embodiments. A reconfigure communications network component 1300 may be invoked when a change in the communications devices is detected. A change in communications devices may include detection of a new communications device, a change in location of a communications device, a change in signal strength of a communications device, and so on. In decision block 1301, if the area encompassed by the communications devices has changed, then the component continues at block 1302, else the component continues at block 1303. In block 1302, the component identifies the area that encompasses the communication devices. In block 1303, the component invokes an identify target configuration component to identify a target configuration for the communications network. In block 1304, the component then directs the agents to assume the target configuration and then completes.

The following paragraphs describe various embodiments of aspects of the OD system. An implementation of the OD system may employ any combination of the embodiments. The processing described below may be performed by a computing device with a processor that executes computer-executable instructions stored on a computer-readable storage medium that implements the OD system.

In some embodiments, a method performed by a computing system for identifying a target configuration of agents for acquiring data is provided. The method generates generating sample configurations that each have a location within a space for each agent. The method selects as the target configuration a sample configuration that is suitable to acquire data by, for at least one or more sample configurations, directing that the agents assume the sample configuration and then acquire data when in the sample configuration and storing an indication of suitability for acquiring data based on the sample configuration. In some embodiments, each agent includes a transmitter and a receiver for transmitting a signal and receiving a return signal. In some embodiments, the transmitted signal and the return signal are selected from a group consisting of an electromagnetic signal, an acoustic signal, and a sonar signal. In some embodiments, the directing and storing for a sample configuration are performed to acquire first data for a first object of a first object type and are performed to acquire second data for a second object of a second object type and the indication of suitability for the sample configuration is based on how the first data and the second data for the sample configuration discriminate the first object from the second object. In some embodiments, when an object is detected, the method directs that the agents assume the target configuration and then acquire target data, wherein the target data is used to identify whether the detected object is of the first object type or the second object type. In some embodiments, the agents form a communications network, and the method further directs that the agents assume the target configuration and provide communication services from those locations. In some embodiments, the agents are selected from a group consisting of an unmanned aerial vehicle, unmanned underwater vehicle, unmanned ground vehicle, and unmanned space vehicle. In some embodiments, the generating of the sample configurations is based on a design-of-experiments technique. In some embodiments, the design-of-experiments technique is a Latin hypercube technique. In some embodiments, the design-of-experiments technique generates candidate configurations and the sample configurations are candidate configurations whose locations satisfy a separation criterion. In some embodiments, the sample configurations are in a three-dimensional space. In some embodiments, a sample configuration has a characteristic of a sensor for an agent and the directing that that agent assume the sample configuration includes directing that agent to use the specified characteristic of the sensor. In some embodiments, the sample configuration has a characteristic of a sensor for each of a plurality of agents. In some embodiments, the characteristic is polarization.

In some embodiments, a method performed by a computing system for determining whether a target object at a target location is of a first object type or a second object type is provided. The method generates sample configurations that each have a location within a space for each of a plurality of agents. In some embodiments, the method selects as a target configuration a sample configuration based on suitability of first sensor data for a first object of a first object type and second sensor data for a second object of a second object type to discriminate the first object from the second object by, for one or more sample configurations, directing that the agents acquire the first sensor data while in the sample configuration and directing that the agents acquire the second sensor data while in the sample configuration. The method directs that the agents assume the target configuration relative to a target location and then acquire target sensor data. The method indicates whether the target object is of the first object type or the second object type based on the target sensor data. In some embodiments, a plurality of sample configurations are selected as target configurations. The method further, for each target configuration, directs that the agents assume the target configuration relative to the target location and then acquire target sensor data. The method further indicates whether the target object is of the first object type or the second object type based on the target sensor data acquired for each of the target configurations. In some embodiments, the agents communicate with each other to coordinate selecting of a next target configuration, positioning at the locations of the next target configuration, and acquiring of the target sensor data while in the next target configuration. In some embodiments, the generating of the sample configurations is based on a design-of-experiments technique. In some embodiments, the design-of-experiments technique is a Latin hypercube technique. In some embodiments, the design-of-experiments technique generates candidate configurations and the sample configurations are candidate configurations whose locations satisfy a separation criterion. In some embodiments, the sensor data is acquired by the agents physically moving to the locations and collecting physical signals. In some embodiments, the sensor data that would be acquired by the agents physically moving to the locations is estimated by a computer program. In some embodiments, the computer program simulates transmitting signals from the agents in the target configuration and then receiving return signals at the agents in the target configuration. In some embodiments, the sensor data is acquired by at least some of the agents transmitting a transmitted signal and at least some of the agents receiving the return signal. In some embodiments, the method determines suitability to discriminate by, for the first sensor data and the second sensor data, converting the return signals into a frequency domain signal, and, for each of a plurality of frequencies, performing a singular value decomposition on the frequency domain signal for that frequency to identify a singular value and then analyzing the singular values derived from the first sensor data and the singular values derived from the second sensor data. In some embodiments, In some embodiments, the method determines suitability to discriminate based on analysis of singular values derived from the frequencies of the return signals. In some embodiments, a sample configuration has a characteristic of a sensor for an agent and the directing that that agent assume the sample configuration includes directing that agent to use the specified characteristic of the sensor. In some embodiments, the sample configuration has a characteristic of a sensor for each of a plurality of agents. In some embodiments, the characteristic is polarization.

In some embodiments, a method performed by a computing system for determining whether a target object is of a first object type or a second object type is provided. The method provides a target configuration having a location for each of a plurality of agents, the target configuration being identified based on suitability of sensor data for the target configuration to discriminate an object of a first object type from an object of a second object type. The method directs that the agents assume the target configuration relative to the location of the target object and acquire target sensor data. The method indicates whether the target object is of the first object type or the second object type based on the target sensor data. In some embodiments, a plurality of target configurations are provided that are identified based on suitability of the sensor data for the target configuration to discriminate between objects of different object types. The method, for each target configuration, directs that the agents assume the target configuration relative to the location of the target object and acquire target sensor data. The method indicates the target object is a certain object type based on the target sensor data acquired based on the target configurations. In some embodiments, the agents communicate with each other to coordinate selecting of a next target configuration, positioning at the locations of the next target configuration, and acquiring of the target sensor data while in the next target configuration. In some embodiments, the target configuration is identified from sample configurations generated based on a design-of-experiments technique. In some embodiments, the design-of-experiments technique is a Latin Hypercube technique. In some embodiments, the design-of-experiments technique generates candidate configurations and the sample configurations are candidate configurations whose locations satisfy a separation criterion. In some embodiments, the computing system is a distributed computing system with each agent being a node of the distributed computing system. In some embodiments, the target configuration specifies a characteristic of a sensor for an agent and the directing that that agent assume the target configuration includes directing that agent to use the specified characteristic of the sensor. In some embodiments, the characteristic is polarization of the sensor. In some embodiments, the characteristic is frequency bandwidth. In some embodiments, the characteristic is modality. In some embodiments, the target configuration specifies multiple characteristics of the sensor. In some embodiments, the target configuration specifies a characteristic of a sensor for each of a plurality of agents.

In some embodiments, a method performed by a computing system establishing a communications network to support communications devices is provided. The method generates sample configurations that each have a location for each agent. The method selecting a target configuration that is suitable for communications by, for one or more sample configurations directing that the agents assume the sample configuration and then communicate with the communications devices and with other agents and storing an indication of suitability of the agents in the sample configuration for communications. In some embodiments, if the agents are not already in the target configuration when the target configuration is selected, the method directs the agents to assume the target configuration. In some embodiments, the method further when an agent detects a change in the communications devices, the method reselects a target configuration. If the agents are not already in the reselected target configuration when it is reselected, the method directs the agents to assume the reselected target configuration. In some embodiments, a change in the communications devices may result from a change in the number of communications devices, a change in the locations of the communication, or a change in a signal strength of a communications device. In some embodiments, the agents are unmanned aerial vehicles ("UAVs"). In some embodiments, the agents are unmanned aerial vehicles ("UAVs") and at least one agent is a non-UAV. In some embodiments, an agent that is a non-UAV is an unmanned ground vehicle ("UGV"). In some embodiments, an agent that is a non-UAV is an unmanned underwater vehicle ("UUV"). In some embodiments, the agents are heterogeneous. In some embodiments, the generating of the sample configurations is based on a design-of-experiments technique. In some embodiments, the design-of-experiments technique is a Latin Hypercube technique. In some embodiments, the design-of-experiments technique generates candidate configurations and the sample configurations are candidate configurations whose locations satisfy a separation criterion. In some embodiments, a sample configuration has a characteristic of a sensor for an agent and the directing that that agent assume the sample configuration includes directing that agent to use the specified characteristic of the sensor. In some embodiments, the sample configuration has a characteristic of a sensor for each of a plurality of agents.

Although the subject matter has been described in language specific to structural features and/or acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

The invention claimed is:

1. A method performed by a computing system for identifying a target configuration of agents for acquiring data, the method comprising:
   generating sample configurations, each sample configuration having a location within a space for each agent; and
   selecting as the target configuration a sample configuration that is suitable to acquire data by, for at least one or more sample configurations,
      directing that the agents assume the sample configuration and then acquire data when in the sample configuration; and
      storing an indication of suitability for acquiring data based on the sample configuration.

2. The method of claim 1 wherein each agent includes a transmitter and a receiver for transmitting a signal and receiving a return signal.

3. The method of claim 2 wherein the transmitted signal and the return signal are selected from a group consisting of an electromagnetic signal, an acoustic signal, and a sonar signal.

4. The method of claim 1 wherein the directing and storing for a sample configuration are performed to acquire first data for a first object of a first object type and are performed to acquire second data for a second object of a second object type and wherein the indication of suitability for the sample configuration is based on how the first data and the second data for the sample configuration discriminate the first object from the second object.

5. The method of claim 4 wherein when an object is detected, directing that the agents assume the target configuration and then acquire target data, wherein the target data is used to identify whether the detected object is of the first object type or the second object type.

6. The method of claim 1 wherein the agents form a communications network and further comprising directing that the agents assume the target configuration and provide communication services from those locations.

7. The method of claim 1 wherein the agents are selected from a group consisting of an unmanned aerial vehicle, unmanned underwater vehicle, unmanned ground vehicle, and unmanned space vehicle.

8. The method of claim 1 wherein the generating of the sample configurations is based on a design-of-experiments technique.

9. The method of claim 8 wherein the design-of-experiments technique is a Latin hypercube technique.

10. The method of claim 8 wherein the design-of-experiments technique generates candidate configurations and the sample configurations are candidate configurations whose locations satisfy a separation criterion.

11. The method of claim 1 wherein the sample configurations are in a three-dimensional space.

12. A method performed by a computing system for determining whether a target object at a target location is of a first object type or a second object type, the method comprising:
   generating sample configurations, each sample configuration having a location within a space for each of a plurality of agents;

selecting as a target configuration a sample configuration based on suitability of first sensor data for a first object of a first object type and second sensor data for a second object of a second object type to discriminate the first object from the second object by, for one or more sample configurations,
  directing that the agents acquire the first sensor data while in the sample configuration; and
  directing that the agents acquire the second sensor data while in the sample configuration;
directing that the agents assume the target configuration relative to a target location and then acquire target sensor data; and
indicating whether the target object is of the first object type or the second object type based on the target sensor data.

13. The method of claim 12 wherein a plurality of sample configurations are selected as target configurations and further comprising:
  for each target configuration, directing that the agents assume the target configuration relative to the target location and then acquire target sensor data; and
  indicating whether the target object is of the first object type or the second object type based on the target sensor data acquired for each of the target configurations.

14. The method of claim 13 wherein the agents communicate with each other to coordinate selecting of a next target configuration, positioning at the locations of the next target configuration, and acquiring of the target sensor data while in the next target configuration.

15. The method of claim 12 wherein the generating of the sample configurations is based on a design-of-experiments technique.

16. The method of claim 15 wherein the design-of-experiments technique is a Latin hypercube technique.

17. The method of claim 15 wherein the design-of-experiments technique generates candidate configurations and the sample configurations are candidate configurations whose locations satisfy a separation criterion.

18. The method of claim 12 wherein the sensor data is acquired by the agents physically moving to the locations and collecting physical signals.

19. The method of claim 12 wherein the sensor data that would be acquired by the agents physically moving to the locations is estimated by a computer program.

20. The method of claim 19 wherein the computer program simulates transmitting signals from the agents in the target configuration and then receiving return signals at the agents in the target configuration.

21. The method of claim 12 wherein the sensor data is acquired by at least some of the agents transmitting a transmitted signal and at least some of the agents receiving the return signal.

22. The method of claim 21 further comprising determining suitability to discriminate by, for the first sensor data and the second sensor data, converting the return signals into a frequency domain signal, and, for each of a plurality of frequencies, performing a singular value decomposition on the frequency domain signal for that frequency to identify a singular value and then analyzing the singular values derived from the first sensor data and the singular values derived from the second sensor data.

23. The method of claim 21 comprising determining suitability to discriminate based on analysis of singular values derived from the frequencies of the return signals.

24. A method performed by a computing system for determining whether a target object is of a first object type or a second object type, the method comprising:
  providing a target configuration having a location for each of a plurality of agents, the target configuration being identified based on suitability of sensor data for the target configuration to discriminate an object of a first object type from an object of a second object type;
  directing that the agents assume the target configuration relative to the location of the target object and acquire target sensor data; and
  indicating whether the target object is of the first object type or the second object type based on the target sensor data.

25. The method of claim 24 wherein a plurality of target configurations are provided, each target configuration being identified based on suitability of the sensor data for the target configuration to discriminate between objects of different object types and further comprising:
  for each target configuration, directing that the agents assume the target configuration relative to the location of the target object and acquire target sensor data; and
  indicating the target object is a certain object type based on the target sensor data acquired based on the target configurations.

26. The method of claim 25 wherein the agents communicate with each other to coordinate selecting of a next target configuration, positioning at the locations of the next target configuration, and acquiring of the target sensor data while in the next target configuration.

27. The method of claim 24 wherein the target configuration is identified from sample configurations generated based on a design-of-experiments technique.

28. The method of claim 27 wherein the design-of-experiments technique is a Latin Hypercube technique.

29. The method of claim 27 wherein the design-of-experiments technique generates candidate configurations and the sample configurations are candidate configurations whose locations satisfy a separation criterion.

30. The method of claim 24 wherein the computing system is a distributed computing system with each agent being a node of the distributed computing system.

31. The method of claim 24 wherein the target configuration specifies a characteristic of a sensor for an agent and the directing that that agent assume the target configuration includes directing that agent to use the specified characteristic of the sensor.

32. The method of claim 31 wherein the characteristic is polarization of the sensor.

33. The method of claim 31 wherein the characteristic is frequency bandwidth.

34. The method of claim 31 wherein the characteristic is modality.

35. The method of claim 31 wherein the target configuration specifies multiple characteristics of the sensor.

36. The method of claim 31 wherein the target configuration specifies a characteristic of a sensor for each of a plurality of agents.

37. A method performed by a computing system for establishing a communications network to support communications devices, the method comprising:
  generating sample configurations, each sample configuration having a location for each agent; and
  selecting a target configuration that is suitable for communications by, for one or more sample configurations:

directing that the agents assume the sample configuration and then communicate with the communications devices and with other agents; and storing an indication of suitability of the agents in the sample configuration for communications.

38. The method of claim 37 wherein if the agents are not already in the target configuration when the target configuration is selected, directing the agents to assume the target configuration.

39. The method of claim 37 further comprising:
when an agent detects a change in the communications devices, reselecting a target configuration; and
if the agents are not already in the reselected target configuration when it is reselected, directing the agents to assume the reselected target configuration.

40. The method of claim 39 wherein a change in the communications devices may result from a change in the number of communications devices, a change in the locations of the communication, or a change in a signal strength of a communications device.

41. The method of claim 37 wherein the agents are unmanned aerial vehicles ("UAVs").

42. The method of claim 37 wherein the agents are unmanned aerial vehicles ("UAVs") and at least one agent is a non-UAV.

43. The method of claim 42 wherein an agent that is a non-UAV is an unmanned ground vehicle ("UGV").

44. The method of claim 42 wherein an agent that is a non-UAV is an unmanned underwater vehicle ("UUV").

45. The method of claim 37 wherein the agents are heterogeneous.

46. The method of claim 37 wherein the generating of the sample configurations is based on a design-of-experiments technique.

47. The method of claim 37 wherein the design-of-experiments technique is a Latin Hypercube technique.

48. The method of claim 37 wherein the design-of-experiments technique generates candidate configurations and the sample configurations are candidate configurations whose locations satisfy a separation criterion.

49. The method of claim 37 wherein a sample configuration having a characteristic of a sensor for an agent and the directing that that agent assume the sample configuration includes directing that agent to use the specified characteristic of the sensor.

50. The method of claim 49 wherein the sample configuration having a characteristic of a sensor for each of a plurality of agents.

51. One or more computing systems for identifying a target configuration of agents for acquiring data, the one or more computing systems comprising:
one or more processors; and
one or more computer-readable storage mediums storing computer-executable instructions that, when executed by the one or more processors, cause the one or more computing systems to perform:
generating sample configurations, each sample configuration having a location within a space for each agent; and
selecting as the target configuration a sample configuration that is suitable to acquire data by, for at least one or more sample configurations,
directing that the agents assume the sample configuration and then acquire data when in the sample configuration; and
storing an indication of suitability for acquiring data based on the sample configuration.

52. The one or more computing systems of claim 51 wherein each agent includes a transmitter and a receiver for transmitting a signal and receiving a return signal.

53. The one or more computing systems of claim 52 wherein the transmitted signal and the return signal are selected from a group consisting of an electromagnetic signal, an acoustic signal, and a sonar signal.

54. The one or more computing systems of claim 51 wherein the directing and storing for a sample configuration are performed to acquire first data for a first object of a first object type and are performed to acquire second data for a second object of a second object type and wherein the indication of suitability for the sample configuration is based on how the first data and the second data for the sample configuration discriminate the first object from the second object.

55. The one or more computing systems of claim 54 wherein the computer-executable instructions, when executed by the one or more processors, cause the one or more computing systems to perform when an object is detected, directing that the agents assume the target configuration and then acquire target data, wherein the target data is used to identify whether the detected object is of the first object type or the second object type.

56. The one or more computing systems of claim 51 wherein the agents form a communications network and wherein the computer-executable instructions, when executed by the one or more processors, cause the one or more computing systems to perform, when executed by the one or more processors, cause the one or more computing systems to perform directing that the agents assume the target configuration and provide communication services from those locations.

57. The one or more computing systems of claim 51 wherein the agents are selected from a group consisting of an unmanned aerial vehicle, unmanned underwater vehicle, unmanned ground vehicle, and unmanned space vehicle.

58. The one or more computing systems of claim 51 wherein the generating of the sample configurations is based on a design-of-experiments technique.

59. The one or more computing systems of claim 58 wherein the design-of-experiments technique is a Latin hypercube technique.

60. The one or more computing systems of claim 58 wherein the design-of-experiments technique generates candidate configurations and the sample configurations are candidate configurations whose locations satisfy a separation criterion.

61. The one or more computing systems of claim 51 wherein the sample configurations are in a three-dimensional space.

62. One or more computing systems for determining whether a target object at a target location is of a first object type or a second object type, the one or more computing systems comprising:
one or more processors; and
one or more computer-readable storage mediums storing computer-executable instructions that, when executed by the one or more processors, cause the one or more computing systems to perform:
generating sample configurations, each sample configuration having a location within a space for each of a plurality of agents;
selecting as a target configuration a sample configuration based on suitability of first sensor data for a first object of a first object type and second sensor data for a second object of a second object type to discriminate the first object from the second object by, for one or more sample configurations,
directing that the agents acquire the first sensor data while in the sample configuration; and
directing that the agents acquire the second sensor data while in the sample configuration;
directing that the agents assume the target configuration relative to a target location and then acquire target sensor data; and
indicating whether the target object is of the first object type or the second object type based on the target sensor data.

63. The one or more computing systems of claim 62 wherein a plurality of sample configurations are selected as target configurations and wherein the computer-executable instructions, when executed by the one or more processors, cause the one or more computing systems to perform:
for each target configuration, directing that the agents assume the target configuration relative to the target location and then acquire target sensor data; and
indicating whether the target object is of the first object type or the second object type based on the target sensor data acquired for each of the target configurations.

64. The one or more computing systems of claim 63 wherein the agents communicate with each other to coordinate selecting of a next target configuration, positioning at the locations of the next target configuration, and acquiring of the target sensor data while in the next target configuration.

65. The one or more computing systems of claim 62 wherein the generating of the sample configurations is based on a design-of-experiments technique.

66. The one or more computing systems of claim 65 wherein the design-of-experiments technique is a Latin hypercube technique.

67. The one or more computing systems of claim 65 wherein the design-of-experiments technique generates candidate configurations and the sample configurations are candidate configurations whose locations satisfy a separation criterion.

68. The one or more computing systems of claim 62 wherein the sensor data is acquired by the agents physically moving to the locations and collecting physical signals.

69. The one or more computing systems of claim 62 wherein the sensor data that would be acquired by the agents physically moving to the locations is estimated by a computer program.

70. The one or more computing systems of claim 69 wherein the computer program simulates transmitting signals from the agents in the target configuration and then receiving return signals at the agents in the target configuration.

71. The one or more computing systems of claim 62 wherein the sensor data is acquired by at least some of the agents transmitting a transmitted signal and at least some of the agents receiving the return signal.

72. The one or more computing systems of claim 71 wherein the computer-executable instructions, when executed by the one or more processors, cause the one or more computing systems to perform determining suitability to discriminate by, for the first sensor data and the second sensor data, converting the return signals into a frequency domain signal, and, for each of a plurality of frequencies, performing a singular value decomposition on the frequency domain signal for that frequency to identify a singular value and then analyzing the singular values derived from the first sensor data and the singular values derived from the second sensor data.

73. The one or more computing systems of claim 71 wherein the computer-executable instructions, when executed by the one or more processors, cause the one or more computing systems to perform determining suitability to discriminate based on analysis of singular values derived from the frequencies of the return signals.

74. One or more computing systems for determining whether a target object is of a first object type or a second object type, the one or more computing systems comprising:
one or more processors; and
one or more computer-readable storage mediums storing computer-executable instructions that, when executed by the one or more processors, cause the one or more computing systems to perform:
providing a target configuration having a location for each of a plurality of agents, the target configuration being identified based on suitability of sensor data for the target configuration to discriminate an object of a first object type from an object of a second object type;
directing that the agents assume the target configuration relative to the location of the target object and acquire target sensor data; and
indicating whether the target object is of the first object type or the second object type based on the target sensor data.

75. The one or more computing systems of claim 74 wherein a plurality of target configurations are provided, each target configuration being identified based on suitability of the sensor data for the target configuration to discriminate between objects of different object types and wherein the computer-executable instructions, when executed by the one or more processors, cause the one or more computing systems to perform:
for each target configuration, directing that the agents assume the target configuration relative to the location of the target object and acquire target sensor data; and
indicating the target object is a certain object type based on the target sensor data acquired based on the target configurations.

76. The one or more computing systems of claim 75 wherein the agents communicate with each other to coordinate selecting of a next target configuration, positioning at the locations of the next target configuration, and acquiring of the target sensor data while in the next target configuration.

77. The one or more computing systems of claim 74 wherein the target configuration is identified from sample configurations generated based on a design-of-experiments technique.

78. The one or more computing systems of claim 77 wherein the design-of-experiments technique is a Latin Hypercube technique.

79. The one or more computing systems of claim 77 wherein the design-of-experiments technique generates candidate configurations and the sample configurations are candidate configurations whose locations satisfy a separation criterion.

80. The one or more computing systems of claim 74 wherein the computing system is a distributed computing system with each agent being a node of the distributed computing system.

81. The one or more computing systems of claim 74 wherein the target configuration specifies a characteristic of a sensor for an agent and the directing that that agent assume the target configuration includes directing that agent to use the specified characteristic of the sensor.

82. The one or more computing systems of claim 81 wherein the characteristic is polarization of the sensor.

83. The one or more computing systems of claim 81 wherein the characteristic is frequency bandwidth.

84. The one or more computing systems of claim 81 wherein the characteristic is modality.

85. The one or more computing systems of claim 81 wherein the target configuration specifies multiple characteristics of the sensor.

86. The one or more computing systems of claim 81 wherein the target configuration specifies a characteristic of a sensor for each of a plurality of agents.

87. One or more computing systems for establishing a communications network to support communications devices, the one or more computing systems comprising:
 one or more processors; and
 one or more computer-readable storage mediums storing computer-executable instructions that, when executed by the one or more processors, cause the one or more computing systems to perform:
  generating sample configurations, each sample configuration having a location for each agent; and
  selecting a target configuration that is suitable for communications by, for one or more sample configurations:
   directing that the agents assume the sample configuration and then communicate with the communications devices and with other agents; and
   storing an indication of suitability of the agents in the sample configuration for communications.

88. The one or more computing systems of claim 87 wherein the computer-executable instructions, when executed by the one or more processors, cause the one or more computing systems to perform if the agents are not already in the target configuration when the target configuration is selected, directing the agents to assume the target configuration.

89. The one or more computing systems of claim 87 wherein the computer-executable instructions, when executed by the one or more processors, cause the one or more computing systems to perform:
 when an agent detects a change in the communications devices, reselecting a target configuration; and
 if the agents are not already in the reselected target configuration when it is reselected, directing the agents to assume the reselected target configuration.

90. The one or more computing systems of claim 89 wherein a change in the communications devices may result from a change in the number of communications devices, a change in the locations of the communication, or a change in a signal strength of a communications device.

91. The one or more computing systems of claim 87 wherein the agents are unmanned aerial vehicles ("UAVs").

92. The one or more computing systems of claim 87 wherein the agents are unmanned aerial vehicles ("UAVs") and at least one agent is a non-UAV.

93. The one or more computing systems of claim 92 wherein an agent that is a non-UAV is an unmanned ground vehicle ("UGV").

94. The one or more computing systems of claim 92 wherein an agent that is a non-UAV is an unmanned underwater vehicle ("UUV").

95. The one or more computing systems of claim 87 wherein the agents are heterogeneous.

96. The one or more computing systems of claim 87 wherein the generating of the sample configurations is based on a design-of-experiments technique.

97. The one or more computing systems of claim 87 wherein the design-of-experiments technique is a Latin Hypercube technique.

98. The one or more computing systems of claim 87 wherein the design-of-experiments technique generates candidate configurations and the sample configurations are candidate configurations whose locations satisfy a separation criterion.

99. The one or more computing systems of claim 87 wherein a sample configuration having a characteristic of a sensor for an agent and the directing that that agent assume the sample configuration includes directing that agent to use the specified characteristic of the sensor.

100. The one or more computing systems of claim 99 wherein the sample configuration having a characteristic of a sensor for each of a plurality of agents.

* * * * *